United States Patent [19]

Beck et al.

[11] 4,423,437
[45] Dec. 27, 1983

[54] OPTOELECTRONIC DEVICE FOR VIDEOFREQUENCY SCANNING OF IMAGES

[75] Inventors: Jean L. Beck; Jean F. Le Bars; Yves A. Emmanuelli; Denis Bargues, all of Paris, France

[73] Assignee: Thomson-CSF, Paris, France

[21] Appl. No.: 311,407

[22] Filed: Oct. 14, 1981

[30] Foreign Application Priority Data

Oct. 17, 1980 [FR] France .................. 80 22275

[51] Int. Cl.³ ............................................. H04N 7/18
[52] U.S. Cl. ................................. 358/113; 358/213; 250/334
[58] Field of Search .................. 358/113, 213; 250/334

[56] References Cited

U.S. PATENT DOCUMENTS

| 4,118,733 | 10/1978 | Sarson | 358/113 |
| 4,217,608 | 8/1980 | MacGregor | 358/113 |
| 4,225,883 | 9/1980 | Van Atta | 358/113 |
| 4,227,210 | 10/1980 | Nixon | 358/113 |
| 4,298,887 | 11/1981 | Rode | 358/113 |
| 4,307,423 | 12/1981 | Atherton | 358/213 |

FOREIGN PATENT DOCUMENTS

2363084 3/1978 France .

Primary Examiner—Howard Britton
Attorney, Agent, or Firm—Oblon, Fisher, Spivak, McClelland & Maier

[57] ABSTRACT

The optoelectronic device comprises an optical element for producing an image scan and an optical element for focusing on an array of detectors. The detected signals are processed by amplifying circuits and a thermal-drift correcting unit comprising an occultation device having two states. A correction loop of the unit includes a memory for storing the values of amplifying circuit signals in the first state of the occultation device, a first circuit for subtracting the stored values from the amplifying circuit outputs in order to compensate for thermal drift, a measuring circuit for obtaining the mean value of the amplified videofrequency signals, and a second circuit for subtracting the mean value from the signal of each detector.

8 Claims, 19 Drawing Figures

OPTOELECTRONIC DEVICE FOR VIDEOFREQUENCY SCANNING OF IMAGES

BACKGROUND OF THE INVENTION

1. Field of the Invention

This invention relates to an optoelectronic device for scanning videofrequency images in which provision is made for correction of thermal drift.

2. Description of the Prior Art

An optoelectronic videofrequency-image scanning device was disclosed in French Pat. No. 2,363,084 published on Mar. 24th, 1978. This known device comprises optical receiving means, optical elements driven in such a manner as to produce an image scan, an optical element for focusing on a detection system comprising an array of detectors and videofrequency means for processing the signals delivered by the detectors. The optoelectronic device for scanning videofrequency images is of the line-by-line type.

At the end of each image scan, a device such as a pattern, for example, is placed in front of the detectors in order to produce a uniform luminous flux on all the detectors. By making use of a correction loop, the signals of each detector can thus be corrected for each image scan by subtracting, in the case of each detector, the memorized value corresponding to the detected uniform flux. This correcting unit, in which a correction loop and a pattern are associated, makes use of preamplifiers provided with an input capacitor for retaining the direct-current components of the signals since recalibration takes place at each image. As a result of periodic recalibration, each measuring chain can be recalibrated prior to each image scan, thus making it possible to take into account the elimination of direct-current components from the signals and to compensate for thermal drift, especially of the first stage of amplification of the signals of each detector without, however, impairing restitution of the image. At the time of an image scan, the time constants of the preamplifier inputs are accordingly chosen so as to ensure that direct-current signals are not reduced in strength by more than 1% during one image-scanning period. The disadvantage attached to the use of a correcting unit of this type lies in the fact that it occupies a substantial proportion of the processing time (at least 25%) solely for recalibrating operations which must essentially be performed at each image scan. Furthermore, and as will become apparent hereinafter, the use of a correcting unit of this type in an optoelectronic device for scanning of images by rotary sweeping would also entail the loss of part of the image, especially in the central zone.

SUMMARY OF THE INVENTION

The present invention is directed to a device for scanning videofrequency images, provision being made for a correcting unit which is not subject to the defects mentioned in the foregoing and in which recalibration carried out during an initialization stage remains valid over a fairly long period of time (typically of the order of a few minutes).

The invention thus relates to an optoelectronic device for scanning videofrequency images comprising an optical element driven in such a manner as to produce an image scan, an optical element for focusing on a detection system comprising at least one array of detectors, and videofrequency means for processing detected signals comprising in particular circuits for amplifying the respective detected signals and a unit for correcting thermal drift. Since each amplifying circuit is connected to the corresponding detector by means of a direct-current coupling, the correcting unit in accordance with the invention comprises a so-called occultation device having two states for producing a uniform flux on all the detectors during an initialization stage and in the first state instead of the reception flux corresponding to the videofrequency image and conversely in the second state which corresponds to normal operation of the scanning device, and a correction loop comprising:

- a storage memory for storing the values of the signals present at the output of said amplifying circuits when the so-called occultation device is in the first state;
- a first circuit for subtracting respectively said stored values from those present at the output of the respective amplifying circuits in order to compensate for the drift aforesaid;
- a measuring circuit for obtaining the mean value of the amplified videofrequency signals;
- a second circuit for subtracting said mean value from the signal of each detector.

BRIEF DESCRIPTION OF THE DRAWINGS

These and other features of the invention will be more apparent upon consideration of the following description and accompanying drawings, wherein.

DETAILED DESCRIPTION OF THE PREFERRED EMBODIMENTS

Figures 1A, 1B:
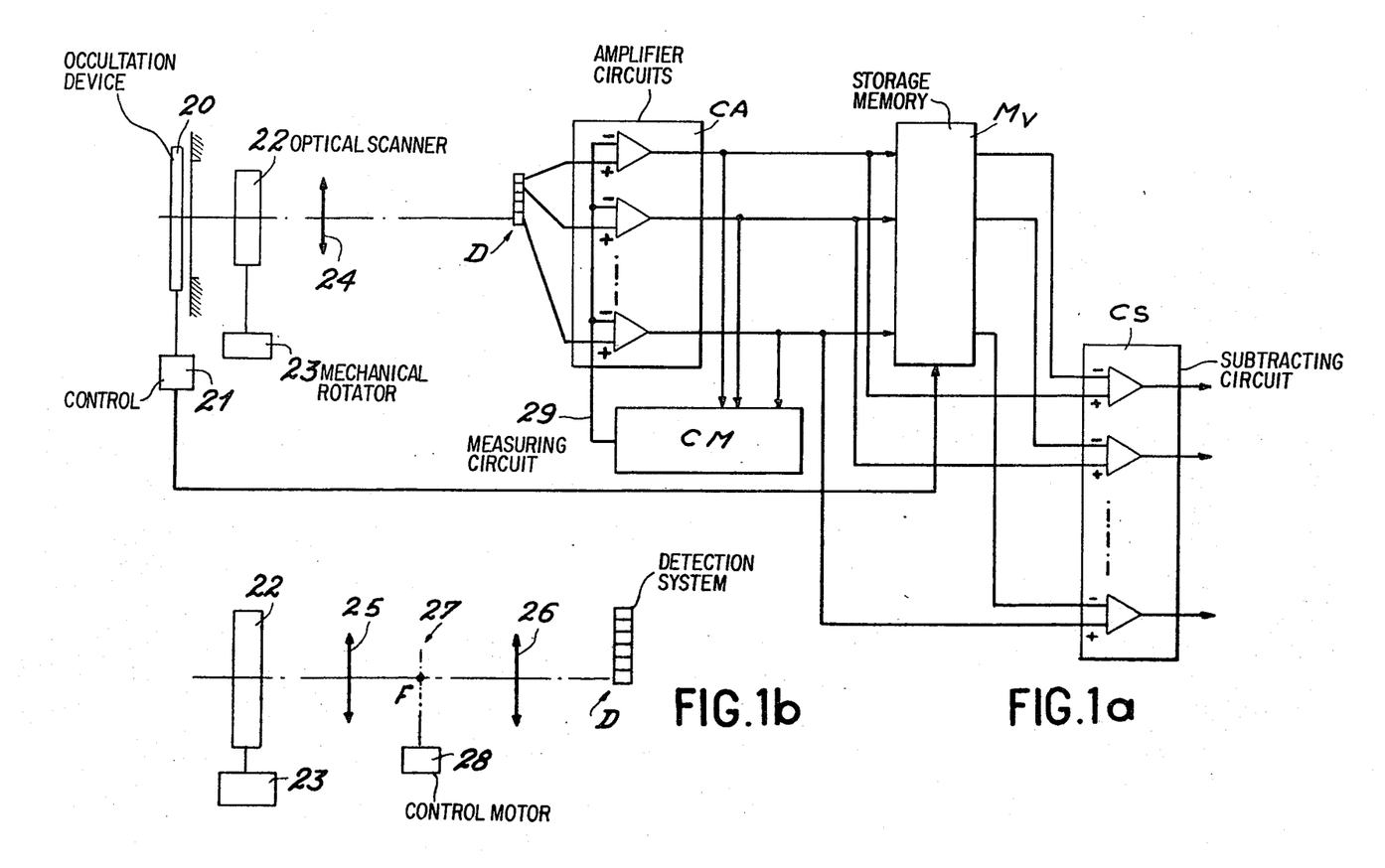
FIG. 1a represents a general diagram of a device according to the invention.
FIG. 1b illustrates an alternative embodiment of said device.

The optoelectronic device for scanning videofrequency images as shown in FIG. 1a comprises an optical scanning element 22 driven in rotation for example by a mechanical means 23 in order to produce an image scan, an optical element 24 for focusing on a detection system D comprising at least one array of detectors. Videofrequency means for processing detection signals comprise in particular circuits CA for amplifying the signals delivered by the detectors, each amplifying circuit being connected to the corresponding detector by means of a direct-current in other words non-capacitive coupling, as well as a correcting unit.

As shown in FIGS. 1a and 1b, the correcting unit comprises a so-called occultation device 20 (or 27) having two states. The first state corresponds to reception of a uniform flux by the detectors of the array and the second state corresponds to reception of the videofrequency image by said detectors (normal state of operation of the scanning device).

The aforesaid device 20 can be controlled by a means 21 placed at the entrance pupil of the device and consists, for example, either of a diaphragm actuated by a motor or a movable shutter, the displacement of which can be controlled by a motor (as shown in FIG. 1a). Said device may also consist of a Lambert-surface diffuser 27. The displacement of said diffuser into and away from the light beam in reciprocating motion is controlled by a motor and placed at the level of an intermediate focal point F which may be provided in the receiving optical system (25, 26) as shown in FIG. 1b. The correcting unit also comprises downstream of the detector:

- a storage memory Mv for storing the signals which are present at the output of the amplifying circuits CA for the detector signals when the occultation device (20, 27) is in the first state. In accordance with FIG. 1, the memory Mv receives from the means 21 a signal which is representative of the first state or of the second state of the device 20;
- a first subtracting circuit CS shown in this example in the form of a series of amplifiers for subtracting respectively the stored values from those present at the output of the circuits for amplifying the signals of the corresponding detectors;
- a measuring circuit CM for producing at the output 29 the mean value of the videofrequency signals which are present at the output of the amplifying circuits CA;
- a second subtracting circuit for subtracting said mean value from the signal delivered by each detector, which can be achieved by transmitting the output signal which is present at the output 29 to the reversing inputs of the first stage consisting of operational amplifier circuits.

Figure 2:
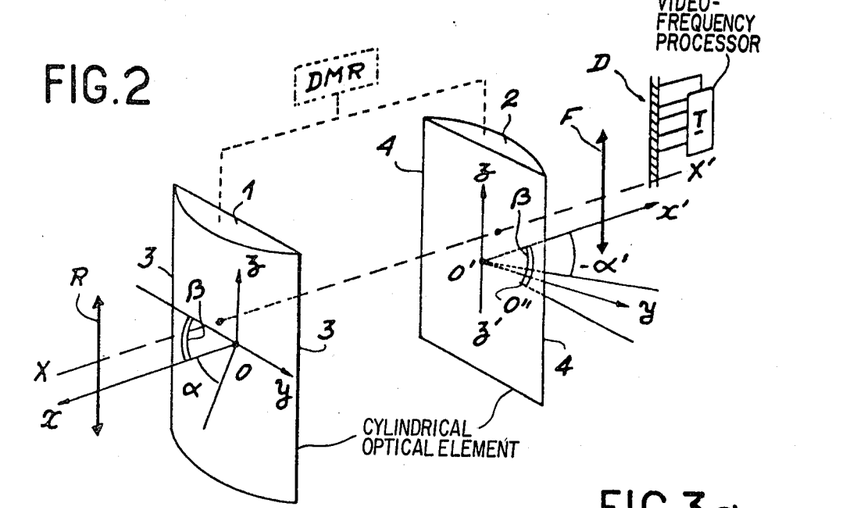
FIG. 2, 3a, 3b, 4a, 4b, 5a, 5b, 6a, 6b, 7a and 7b illustrate the operation of rotary scanning.

FIG. 2 illustrates two cylindrical optical elements 1 and 2, namely two cylindrical lenses having generator-lines 3 and 4 respectively. The two cylindrical optical elements 1 and 2 are driven in rotation and in rigidly fixed relation by means of a DMR device. This movement of rotation takes place about an axis X—X' at right angles to the direction of the generator-lines 3 and 4. An optical focusing element F placed downstream serves to focus the light rays issuing from the cylindrical element 2 on an array of detectors D located in its focal plane and comprising a plurality of detectors which extend from the optic axis X—X' of the device. The light rays corresponding to the scanned image are introduced at the entrance of the cylindrical optical element 1. To this end, use may be made of optical receiving means R consisting, for example, of a receiving dome and/or an optical reflecting element. As will now be shown, the combined displacement of the cylindrical optical elements 1 and 2 in rotational motion will produce rotary scanning of the image on the array of detectors D. Videofrequency means T for processing the signals delivered by the detectors are associated with the detectors of the array D.

There are also shown in FIG. 2 two light rays which are incident upon the cylindrical optical element 1 at a point O. These two light rays are inclined to the axis X—X' respectively at the angles $\alpha$ and $\beta$. The ray which is inclined to the axis X—X' at an angle $\alpha$ is located in a plane xOy at right angles to the generator-lines 3 of the optical element 1. The ray which is inclined to the axis X—X' at an angle $\beta$ is located in a plane xOz parallel to the generator-lines 3.

Figure 3A:
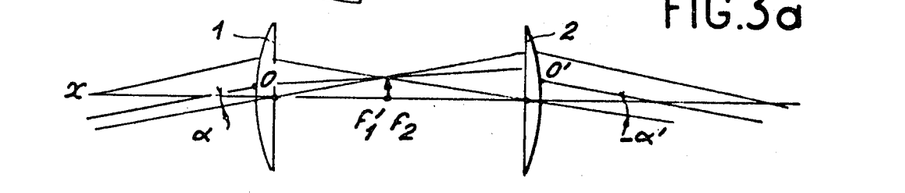

FIG. 3a is a view in cross-section in the plane xOy in which the cylindrical optical elements (consisting of cylindrical lenses in the case under consideration) may be assimilated with converging lenses. The two foci of the lenses shown in FIG. 3a coincide so as to form an a focal system and the light ray emerging from the lens 2 will make with this latter an angle $-\alpha'$ defined by the relation:

$$tg\alpha' = (f'_1/f_2)tg\alpha$$

where $f'_1$ and $f_2$ are the respective focal distances of the lens 1 and of the lens 2.

In the particular case in which these focal distances are equal, we will have $\alpha' = -\alpha$.

Figure 3B:
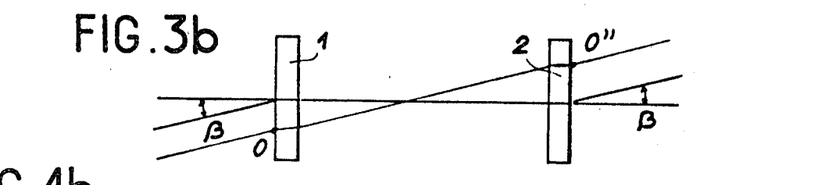

FIG. 3b is a view in cross-section along a plane which passes through the point O and is parallel to the generator-lines, namely the plane xOz. In this plane or in any plane parallel to the generator-lines, the lenses 1 and 2 are plates having parallel faces, with the result that any light ray which is incident at an angle $\beta$ with respect to the axis Ox will also emerge at an angle $\beta$. The corresponding emergent ray is shown in FIG. 1.

Figure 4A:
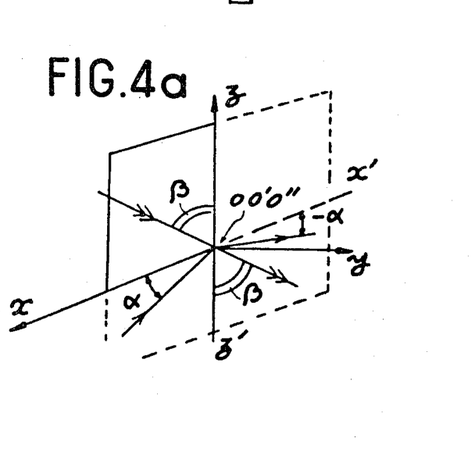

With reference to FIG. 4a in which the points O, O' and O'' coincide as represented by convention, the angular deviations of each aforementioned incident ray are shown in the case in which the focal distances of the lenses 1 and 2 are equal.

From the angular point of view, the deviations revert to the product of a symmetry with respect to a point and of a symmetry with respect to a plane which contains the axes X—X' and z—z', that is, a plane parallel to the axis of rotation X—X' of the cylindrical optical elements and to their generator-lines, and the result thereby achieved is the same as if a fictitious mirror were located in the plane xOz.

At the exit of the lens 2, a ray endowed with a movement of rotation which is duplicated with respect to the movement of rotation of the lenses 1 and 2 about the axis X—X' will consequently correspond to any incident ray at the entrance of the lens 1. A rotation of the cylindrical lenses through an angle of 90° will correspond to a rotation of the image about the detector through an angle of 180°.

Figure 4B:
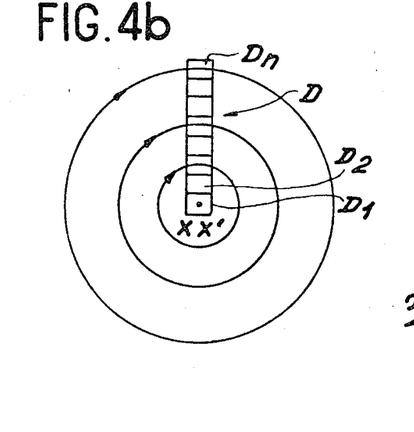

FIG. 4b shows the circular scanning obtained when the focal distances of the two lenses are equal. An array of uniformly spaced detectors ($D_1, D_2, \ldots D_n$) and extending from the axis X—X', the trace of which corresponds to an end detector $D_1$ of the array, will be scanned by rotation of the image.

Figure 5A:
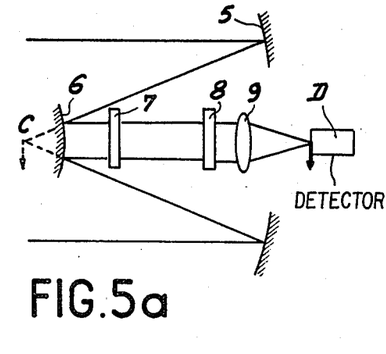
Figure 5B:
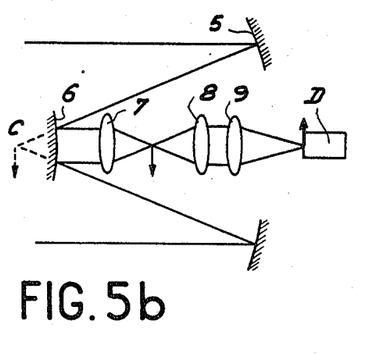

FIGS. 5a and 5b illustrate an embodiment in which the incident light rays are reflected back to the entrance of a group of two cylindrical lenses 7 and 8 by means of a beam-bending device of the Cassegrain type comprising a principal mirror 5 provided with an axial opening and a secondary mirror 6. A converging lens 9 focuses the light rays emerging from the cylindrical lens 8 on the detector D. The axis which passes through the center of the spherical mirror 6 and is perpendicular to the generator-lines of the cylindrical lenses 7 and 8 defines the optic axis of the system.

In FIG. 5a, which is a cross-section of the system along a plane parallel to the generator-lines of the lenses 7 and 8, the beam shown in the figure is parallel to the optic axis of the system and is converted by the set of mirrors 5 and 6 to a beam which is parallel to the optic axis of the system.

By virtue of the fact that, in the plane parallel to the generator-lines, the cylindrical lenses 7 and 8 are comparable with plates having parallel faces, the parallel beam will be focused on the detectors by the converging lens 9. A virtual image will therefore be produced at the center of the spherical lens 6 and a real image having the same direction will be focused on the detectors.

In FIG. 5b, which is a cross-section along a plane perpendicular to the generator-lines of the cylindrical lenses 7 and 8, the beam which is parallel to the optic axis is also reflected back by the set of mirrors 5 and 6 in the form of parallel rays. The cylindrical lens 7 which is comparable in this plane with a converging lens will focus these rays in its focal plane and the cylindrical lens 8 will re-convert the rays to a beam which is parallel to the optic axis. The beam will pass through the converging lens 9 and will be focused on the array of detectors D. There will therefore be produced a virtual image at the center C of the spherical mirror 6, a real image having the same direction at a distance equal to the focal distance of the lens 7, and a real image of opposite direction at the level of the detector.

Figure 6A:
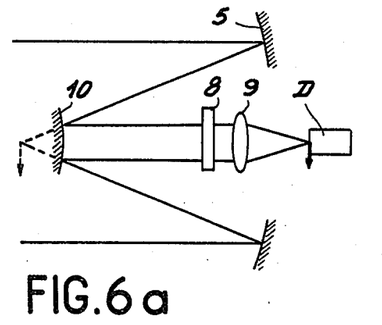
Figure 6B:
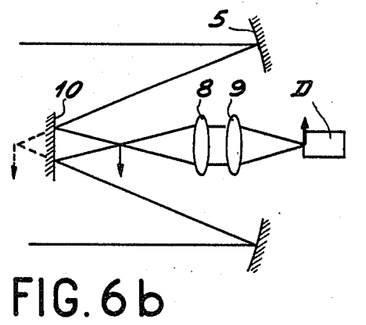

FIGS. 6a and 6b illustrate a variant of FIGS. 5a and 5b in which a cylindrical mirror 10 is substituted for the spherical mirror 6 and the cylindrical lens 7. The generator-lines of said cylindrical mirror 10 are perpendicular to the generator-lines of the cylindrical lens 8.

In FIG. 6a, which is a cross-section along a plane parallel to the generator-lines of the cylindrical lens 8, a beam parallel to the optic axis of the system is reflected back in the form of a parallel beam from a cylindrical mirror 10 which is comparable with a spherical mirror in this plane. The parallel beam passes through the cylindrical lens 8 which is comparable in this plane with a plate having parallel faces and is then focused on the array of detectors D by the converging lens 9. A virtual image is therefore produced in this plane at the level of a point corresponding to the center of the cylindrical mirror 10. A real image is produced at the level of the array of detectors and has the same direction as the other image.

In FIG. 6b, which is a cross-section along a plane perpendicular to the generator-lines of the cylindrical lens 8, a beam parallel to the optic axis of the system is reflected back by the cylindrical lens 10 which, in this plane, is comparable with a plane mirror. Said beam is convergent in a plane corresponding to the focus of the cylindrical lens 8 which is comparable in this plane with a converging lens and forms at the exit of this latter a parallel beam which passes through the converging lens 9 and is focused on the array of detectors D. There are therefore produced a virtual image located at a point of the focus of the cylindrical lens 8 which is symmetrical with respect to the trace of the cylindrical mirror 10, a real image having the same direction at the focus of the cylindrical lens 8, and a real image of opposite direction at the level of the detectors.

Figure 7A:
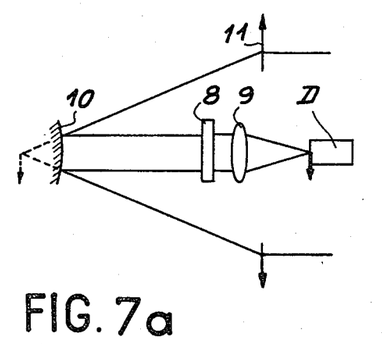
Figure 7B:
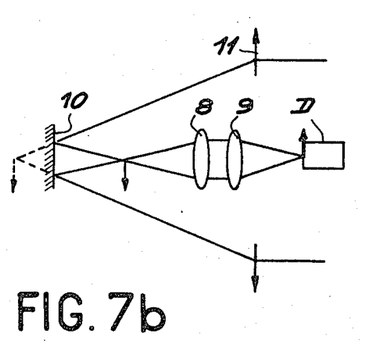

FIGS. 7a and 7b are variants of FIGS. 6a and 6b in which the principal mirror 5 is replaced by a converging lens 11 provided with an axial aperture. The optical diagrams shown correspond to those of FIGS. 6a and 6b. It will readily be apparent that a substitution of this type is also possible in the case of FIGS. 5a and 5b.

In the case of line-by-line scanning, the detectors are also mounted in an array and displacement of the image takes place transversely with respect to the axis of said array. Image reconstruction is similar, with the exception of differences in systems of coordinates.

The following figures therefore relate to electronic circuits which are intended to be employed irrespective of the mode of scanning which may be contemplated.

Figure 8:
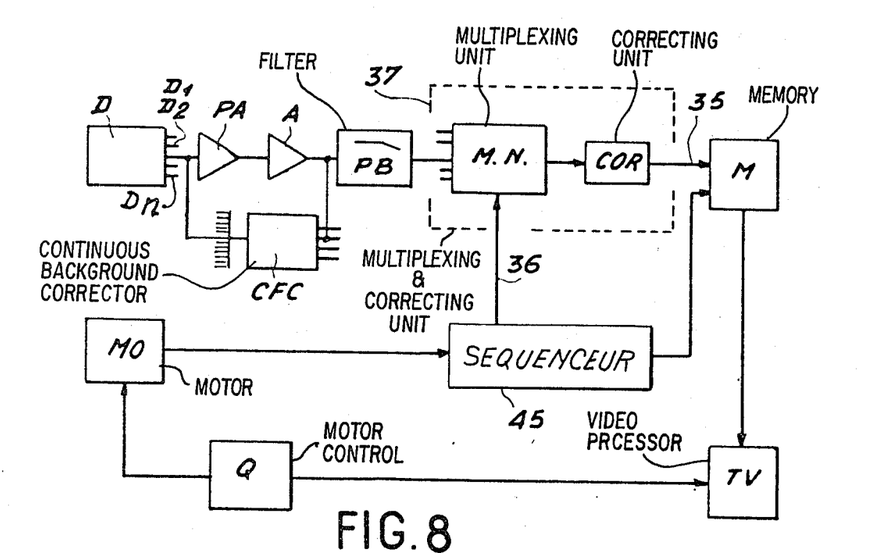
FIG. 8 represents a general diagram of the means for processing videofrequency signals.

FIG. 8 illustrates an electronic assembly for videofrequency processing of detecting signals. There is associated with each detector an amplifying circuit composed of a preamplifier PA and of an amplifier A, a continuous-background corrector which eliminates the direct-current components of the measuring signals and a low-pass filter for limiting the passband and therefore improving the signal-to-noise ratio.

The amplified and filtered voltages are introduced into a multiplexing and correcting unit 37. This unit comprises a multiplexing and digital coding circuit MN and a circuit COR for correcting residual voltages. The measured values are fed sequentially into a memory M via a bus line 35. Sampling of the signals is synchronized for example from a quartz crystal unit Q which controls a motor MO for driving the optical elements in rotation in a manner known per se.

The sequencer 45 progressively feeds the values corresponding to the coordinates into the memory M in response to a control signal delivered by the synchronization unit mentioned above and corresponding to the beginning of further multiplexing of the n detectors. The measured values will thus be stored in memory, for example line by line and image by image, in accordance with a table corresponding to Cartesian coordinates. A TV video processing unit which is preferably synchronized by the quartz crystal unit Q will generate sequentially line-by-line television images.

Figure 9:
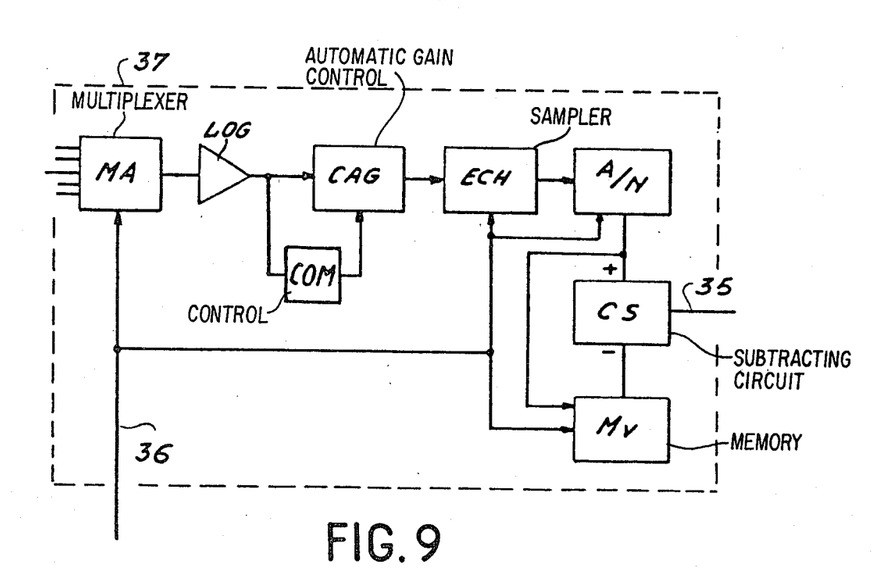
FIG. 9 illustrates a unit for multiplexing and correcting residual voltages.

One embodiment of the multiplexing and correcting unit 37 is shown in FIG. 9 and comprises:

- a multiplexing analog circuit MA which receives at its input an amplified signal delivered by the detectors;
- a logarithmic amplifier LOG having the function of compressing the signals corresponding to very luminous objects in order to prevent saturation;
- an automatic gain control circuit CAG which receives control signals from the output of the logarithmic amplifiers LOG via a control circuit COM;
- a sampling circuit ECH in which the signals derived from automatic gain control circuits CAG are read by sampling and fed sequentially into an analog-to-digital converter A/N;
- a subtracting circuit CS for receiving at its input the output signals of the analog-to-digital converter A/N and signals stored in a memory Mv and corresponding to the values of the signals delivered by each detector under reference conditions;
- a synchronization provided by a line 36 and distributed to the circuits MA, ECH, A/N and Mv.

By means of the subtracting circuit CS, the contents of the memory Mv relating to the corresponding detector are subtracted sequentially from each value measured by each detector. As will be explained in greater detail hereinafter, the design function of said subtracting circuit is to permit initialization of all the detectors prior to turn-on of the devices, or at predetermined time intervals.

Initialization permits elimination of residual voltages corresponding to drift and especially thermal drift of the inputs of the amplifying circuits and especially of the preamplifiers of the detectors; said initialization is performed once and for all when the device is put into service, or at intervals of N images, where N is a function of tolerated drift. Initialization is performed by subjecting all the detectors to a uniform flux, for example by occultation of the system. The values measured by each detector under these predetermined conditions are stored in the memory $M_v$ and then subtracted from the measurement values of the corresponding detectors, said values being sampled at the time of an image detection.

As will be clearly apparent, the initialization operation mentioned above can also be carried out by making use of known analog devices for performance of the memory function at the time of initialization and then making use of amplifiers and coupling logic in order to perform the subtraction operation.

Figure 10:
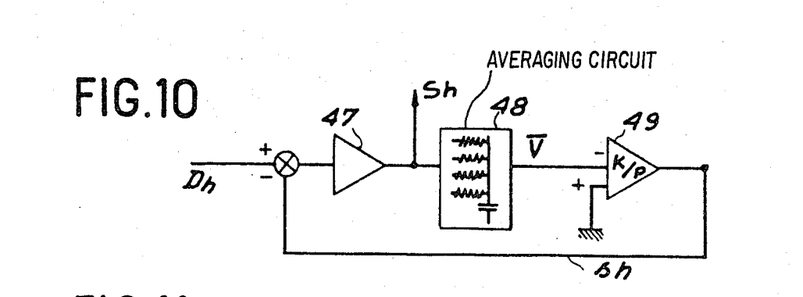
FIG. 10 represents a diagram of a measuring circuit, one embodiment of which is shown in FIG. 11.
Figure 11:
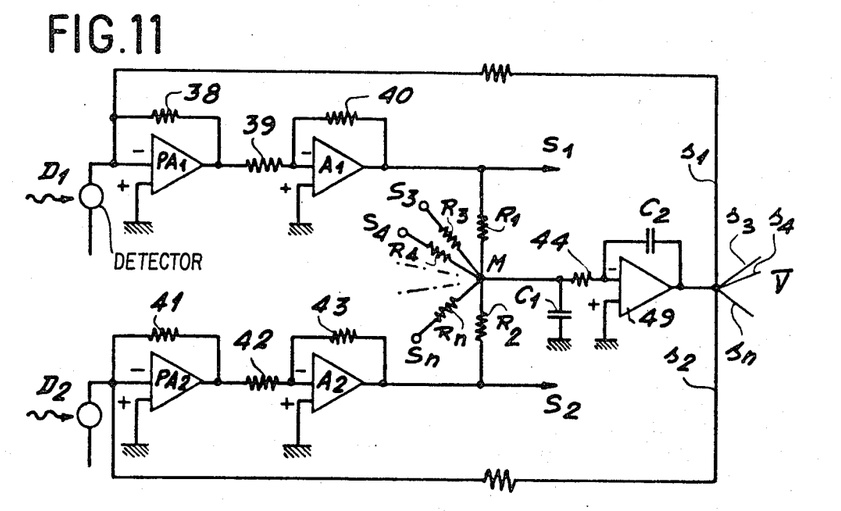
Figure 12A:
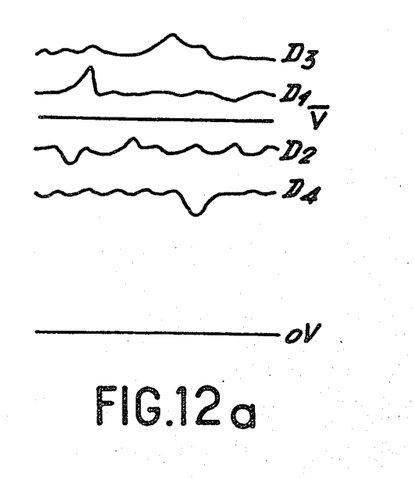
FIGS. 12a and 12b are representative of the action of the measuring circuit after subtraction of the signals delivered by the detectors.
Figure 12B:
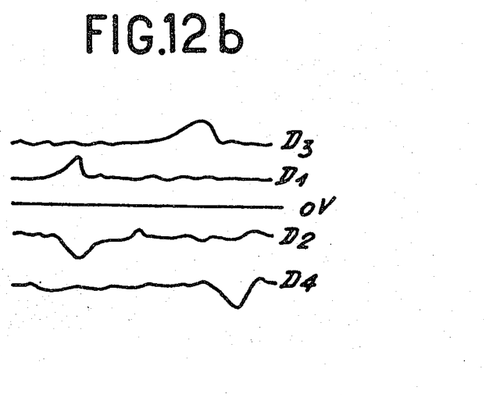

Referring to FIGS. 10 to 12, there will now be described one embodiment of the correcting circuit CFC which subtracts the mean direct-current component from all the signals. This arrangement is particularly advantageous in the event that infrared detectors are employed. Since initialization of the detectors may not take place periodically but once and for all, it is in fact difficult to employ in this case preamplifiers provided with an input capacitor. This arises from the fact that, if a zone of large area and low but constant contrast appears in the image, it could only produce direct-current signals at the time of scanning and irrespective of its light intensity, said signals being reduced in strength with a predetermined time constant. This would result in impairment and loss of contrast of the image. In accordance with the invention, the preamplifiers employed are therefore not provided with an input capacitor and the mean direct-current component of the image is eliminated.

Referring now to FIG. 10, a signal corresponding to a detector $D_h$ is fed into an amplifying circuit 47. The signals delivered by the amplifier 47 are fed into an averaging circuit 48 which also receives signals from all the other detectors which form the array. Said circuit 48 produces at its output a mean value $\overline{V}$ and this value is fed into an amplifier 49 which may be an integrating amplifier, the output signal $s_h$ of which is returned as negative feedback to the input of the amplifier 47. The system will control the output of the amplifier 47 designated by the reference $S_h$ so as to cause delivery of a signal which is centered with respect to the mean value of all the signals.

FIG. 11 shows an embodiment of the diagram of FIG. 12. A signal produced by a detector $D_1$ is fed to the negative input of a preamplifier PA1 comprising a negative feedback resistor 38. The signals at the output of the amplifier PA1 are fed into an amplifier A1 comprising an input resistor 39, a negative feedback resistor 40 as well as an output $S_1$.

The signals delivered by a detector $D_2$ are applied to the negative input of a preamplifier PA2 comprising a negative feedback resistor 41. The signals delivered by the preamplifier PA2 are fed to an amplifier A2 comprising an input resistor 42 and a negative feedback resistor 43 as well as an output $S_2$. The outputs $S_1$, $S_2$, $S_3$, $S_4$, ... $S_n$ which correspond to measuring chains, the gains of which have been adjusted so as to correspond to generally equal gains, are connected to a common point M through resistors having equal values and designated respectively by the references $R_1$, $R_2$, $R_3$, $R_4$, ... $R_n$, a capacitor $C_1$ being placed between said common point M and ground. The point M is also connected to the negative input of an integrator 49 comprising an input resistor 44 and a negative feedback capacitor $C_2$. The output of the integrator 49 is connected via resistive lines $s_1$, $s_2$, $s_3$, $s_4$, ... $s_n$ to the negative inputs of the preamplifiers corresponding in each case to the detectors which constitute the array of detectors.

FIG. 12a shows amplified signals delivered by a system comprising four detectors $D_1$, $D_2$, $D_3$, $D_4$. It is apparent that the mean value is located at a value $\overline{V}$ which is very different from the zero-volt level.

FIG. 14b shows the signals corresponding to the detectors $D_1$, $D_2$, $D_3$, $D_4$ when a circuit of the type described in FIGS. 12 and 13 is employed. The values shown are centered around the zero-volt value. The direct-current component of the signals have thus been eliminated without impairing the relevant direct-current information of the signals.

It will be noted that the circuit described in the foregoing is fabricated by means of analog techniques. It will readily be apparent that digital techniques based on the same diagram also come within the scope of the invention. In fact, each of the operations described in FIGS. 10 and 11 can readily be transposed in the event that a processing operation of the type described is performed on signals which have been converted to the digital mode.

What is claimed is:

1. An optoelectronic device for scanning videofrequency images comprising an optical element driven in such a manner as to produce an image scan, an optical element for focusing on a detection system comprising at least one array of detectors, and videofrequency means for processing detailed signals comprising in particular circuits for amplifying the respective detected signals and a correcting unit, wherein each amplifying circuit is connected to the corresponding detector by means of a direct-current coupling and said correcting unit is formed by a so-called occultation device having two states for producing a uniform flux on all the detectors during an initialization stage and in the first state instead of the reception flux corresponding to the videofrequency image and conversely in the second state, and a correction loop comprising:
   a storage memory for storing the values of the signals present at the output of said amplifying circuits when the occultation device is in the first state;
   a first circuit for subtracting respectively said stored values from those present at the output of the respective amplifying circuits in order to compensate for the drift aforesaid;
   a measuring circuit for producing the mean value of the amplified videofrequency signals;
   a second circuit for subtracting said mean value from the signal of each detector.

2. A device according to claim 1, wherein said circuit for measuring the mean value of videofrequency signals comprises a videofrequency mean value integrator, with the result that the measuring circuit produces the integrated videofrequency mean value at the output.

3. A device according to claim 2, wherein said measuring circuit comprises an array of resistors having a common terminal, a voltage which is representative of a signal delivered by a detector being applied to the other terminal of each resistor, a capacitor connected to said common terminal and to ground and a connection between the common terminal and the input of an integrating amplifier, and wherein said second subtracting circuit comprises a negative feedback loop for re-injecting said mean value which is present at the output of the amplifier at the input of each amplifying circuit corresponding to each detector.

4. A device according to claim 1, wherein the detectors are infrared detectors.

5. A device according to claim 1, wherein the so-called occultation device is a diaphragm which is caused to close under the control of a drive unit and is placed in front of the entrance pupil of said device.

6. A device according to claim 1, wherein the occultation device is a movable shutter placed in front of the entrance pupil of said device.

7. A device according to claim 1, wherein the occultation device is a Lambert-surface diffuser placed at an intermediate focal point of the device.

8. A device according to claim 1 wherein said scanning is rotary.

* * * * *